(12) United States Patent  
Mak

(10) Patent No.: US 8,209,996 B2
(45) Date of Patent: Jul. 3, 2012

(54) FLEXIBLE NGL PROCESS AND METHODS

(75) Inventor: John Mak, Santa Ana, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 1064 days.

(21) Appl. No.: 10/595,528

(22) PCT Filed: Oct. 5, 2004

(86) PCT No.: PCT/US2004/032788
§ 371 (c)(1),
(2), (4) Date: Feb. 28, 2007

(87) PCT Pub. No.: WO2005/045338
PCT Pub. Date: May 19, 2005

(65) Prior Publication Data
US 2007/0240450 A1  Oct. 18, 2007

Related U.S. Application Data

(60) Provisional application No. 60/516,120, filed on Nov. 3, 2003.

(51) Int. Cl.
*F25J 3/00* (2006.01)
(52) U.S. Cl. ............... 62/628; 62/620; 62/630
(58) Field of Classification Search .......... 62/628, 62/630, 635, 640, 644, 656, 657, 618–620, 62/631
See application file for complete search history.

(56) References Cited

U.S. PATENT DOCUMENTS

| | | | |
|---|---|---|---|
| 2,603,310 A | 7/1952 | Gilmore | |
| 2,771,149 A | 11/1956 | Miller et al. | |
| 3,421,610 A | 1/1969 | Marshall | |
| 3,793,157 A | 2/1974 | Hobbs et al. | |
| 4,102,659 A | 7/1978 | Martin | |
| 4,496,380 A * | 1/1985 | Harryman | 62/630 |
| 4,509,967 A * | 4/1985 | Sweet | 62/625 |
| 4,695,349 A * | 9/1987 | Becker et al. | 203/26 |
| 4,854,955 A | 8/1989 | Campbell et al. | |
| 5,669,238 A * | 9/1997 | Devers | 62/657 |
| 5,687,584 A * | 11/1997 | Mehra | 62/632 |
| 5,771,712 A * | 6/1998 | Campbell et al. | 62/621 |
| 5,890,378 A * | 4/1999 | Rambo et al. | 62/621 |
| 5,953,935 A | 9/1999 | Sorensen | |
| 6,006,546 A * | 12/1999 | Espie | 62/656 |
| 6,112,549 A | 9/2000 | Yao et al. | |
| 6,116,050 A * | 9/2000 | Yao et al. | 62/630 |
| 6,116,051 A * | 9/2000 | Agrawal et al. | 62/630 |
| 6,182,469 B1 * | 2/2001 | Campbell et al. | 62/621 |
| 6,363,744 B2 | 4/2002 | Finn et al. | |
| 6,401,486 B1 * | 6/2002 | Lee et al. | 62/630 |
| 6,453,698 B2 * | 9/2002 | Jain et al. | 62/621 |
| 2004/0206112 A1 * | 10/2004 | Mak | 62/617 |
| 2004/0261452 A1 * | 12/2004 | Mak et al. | 62/620 |
| 2011/0067442 A1 * | 3/2011 | Martinez et al. | 62/620 |

* cited by examiner

*Primary Examiner* — Frantz Jules
*Assistant Examiner* — Lukas Baldridge
(74) *Attorney, Agent, or Firm* — Fish & Associates, PC

(57) ABSTRACT

Contemplated plants include an absorber in which the split ratio of various feed streams to an absorber are used to control recovery of a desired component in a bottom product of a distillation column that receives the bottom product of the absorber. In especially preferred aspects, the plant is an NGL plant and the split ratio of the feed streams used to control the level of desired ethane recovery.

10 Claims, 3 Drawing Sheets

FLEXIBLE NGL PROCESS AND METHODS

This application claims the benefit of our U.S. provisional patent application with the Ser. No. 60/516,120, which was filed Nov. 3, 2003, and which is incorporated by reference herein.

FIELD OF THE INVENTION

Gas processing, and especially gas processing for flexible ethane recovery/rejection.

BACKGROUND OF THE INVENTION

Expansion processes have been widely used for hydrocarbon liquids recovery in the gas processing industry and are generally preferred for high ethane and propane recovery. External refrigeration is normally required in such processes where the feed gas contains significant quantities of propane and heavier components. For example, in a typical turbo-expander plant, the feed gas is cooled and partially condensed by heat exchange with process streams and/or external propane refrigeration. The condensed liquid containing the less volatile components is then separated and fed to a fractionation column, which is operated at medium or low pressure. The remaining vapor portion is letdown in pressure in a turbo-expander to a still lower pressure, resulting in further cooling and liquid formation. With the expander discharge pressure typically at demethanizer pressure, the two-phase stream is fed to the top of the demethanizer with the cold liquids acting as the top reflux to absorb the heavier hydrocarbons. The remaining vapor combines with the column overhead as a residue gas, which is then heated and recompressed to pipeline pressure.

However, in many expander plant configurations, the residue vapor from the fractionation column still contains a significant amount of ethane or propane plus hydrocarbons that could be recovered if chilled to a lower temperature, or subjected to a rectification stage. While lower temperature can be achieved with a higher expansion ratio across the turbo-expander, various disadvantages arise. Among other things, higher expansion typically results in lower column pressure and higher residue gas compression horsepower requirements, making high recovery uneconomical. Therefore, many NGL recovery configurations employ an additional rectification column, and use of a colder and leaner reflux stream to the fractionation column overhead vapor (see below). Furthermore, most known NGL recovery configurations are optimized for a single mode of operation (i.e., ethane recovery or propane recovery). Thus, when such NGL plants are required to switch recovery mode (e.g., from ethane to propane recovery), the efficiency and recovery levels tend to significantly drop. Still further, substantial reconfiguration and changes in operation conditions are necessary in most plants to achieve acceptable results. For example, most of the known plant configurations recover more than 98% of $C_3$ and heavier hydrocarbons during the ethane recovery, but often fail to maintain the same high propane recovery during ethane rejection. In ethane rejection operation, the propane recovery levels from such processes often drop to about 90%, thereby incurring significant loss in product revenue.

Present NGL recovery systems can be classified into single-column configurations or two-column configurations, and some operating differences are summarized below. A typical single-column configuration for ethane recovery (which is also suitable for ethane rejection) is described in U.S. Pat. No. 4,854,955. Such configuration may be employed for moderate levels of ethane recovery due to the relatively low operating temperature and pressure of the fractionation column. In such plants, the column overhead vapor is cooled and condensed by an overhead exchanger using refrigeration generated from the feed gas chiller. This additional cooling step condenses the propane and heavier components from the column overhead gas, which is recovered in a downstream separator and returned to the column as reflux. For ethane rejection, this column operates as a deethanizer, and the pressure is typically lowered to about 350 psig to generate sufficient refrigeration from turbo-expansion and for the ethane/propane separation. However, the lower column pressure generally results in an increased residue gas compression horsepower demand. Other NGL recovery configurations that employ a single column for both ethane recovery and ethane rejection are described in U.S. Pat. No. 6,453,698. Here, an intermediate stream is withdrawn from the column to produce a lean vapor that is further cooled and condensed to generate a lean reflux to the column. While the heat integration, reflux configuration, and process complexity vary among many of these designs, all or almost all suffer from high energy consumption (e.g., due to the lower column pressure needed for cooling and fractionation).

Alternatively, a typical two-column NGL plant employs a reflux absorber and a second column that is operated as a demethanizer or deethanizer, which generally allows more flexibility in operating the absorber and the second column at different pressures. However, conventional two-column plants are generally only economic for either ethane recovery or propane recovery, but not both, and switching recovery modes will often incur significant propane losses (e.g., provide less than 98% plus $C_3$ recovery).

For example, in U.S. Pat. Nos. 5,953,935 and 5,771,712, the overhead vapor or liquid from the second distillation column is recycled to the absorber as a lean reflux. While such plants provide relatively high ethane and propane recoveries, ethane rejection with high-yield propane recovery is often problematic under most operating conditions. Alternatively, as shown in U.S. Pat. No. 6,363,744, a portion of the residue gas stream from the residue gas compressor discharge is recycled as a lean reflux in the demethanizer. However, using residue gas to generate a cold reflux for the demethanizer consumes a large amount of horsepower, and the cost of residue gas compression is prohibitively high and usually not economical. Moreover, almost all of the above configurations require cryogenic operating temperatures for both the absorber and the distillation columns for ethane recovery operations, thereby increasing the capital cost of installation.

Thus, numerous attempts have been made to improve the efficiency and economy of processes for separating and recovering ethane and heavier natural gas liquids from natural gas. However, all or almost all of them fail to achieve economic operation when ethane rejection is required. Moreover, currently known configurations fail to provide flexibility in operation where recovery of ethane is only temporarily desired. Therefore, there is still a need to provide improved methods and configurations for flexible natural gas liquids recovery.

SUMMARY OF THE INVENTION

The inventors have discovered that high and flexible NGL recovery (e.g., at least 99% $C_3$, and above at least 90% $C_2$) may be achieved in a plant configuration in which split ratios between various absorber feed streams determine the desired degree of recovery of $C_2$ and $C_3$ components in the distillation column bottom product.

In one contemplated aspect of the inventive subject matter, a plant includes an absorber that is configured to separately receive a first and a second portion of a feed gas vapor, a first and a second portion of a feed gas liquid, and a first and a second portion of a distillation column overhead, wherein the first portion of the feed gas vapor and the first portion of the distillation column overhead provide reflux to the absorber. In such plants, a control unit controls the ratio of at least one of (a) the first and second portion of the feed gas vapor, (b) the first and second portion of the feed gas liquid, and (c) the first and second portion of the distillation column overhead as a function of the desired recovery rate of a feed gas component (e.g., ethane) in the bottom product of the distillation column. Among other advantages, it should be recognized that the split ratio determines the absorber overhead temperature.

Most preferably, the distillation column is configured to operate as a demethanizer and/or deethanizer and operates at the same, or at lower pressure than the absorber. Where the absorber operates at a higher pressure than the distillation column, it is typically preferred that expansion of the absorber bottom product will be employed to provide cooling (most preferably of the feed gas). Furthermore, it is generally preferred that the second portion of the distillation column overhead is fed to the bottom of the absorber to thereby form a stripping gas. Thus, in preferred configurations, the ethane recovery in the bottom product increases when the first portion of the feed gas vapor increases relative to the second portion of the feed gas vapor, and/or when the first portion of the distillation column overhead decreases relative to the second portion of the distillation column overhead.

Consequently, in another aspect of the inventive subject matter, a method of operating a plant includes a step of providing an absorber and a distillation column, wherein the absorber receives a plurality of absorber feed streams and provides a bottom product to the distillation column. In another step, at least one of the feed streams is split into a first and second portion, wherein the first and second portions are introduced into the absorber at different locations, and in still another step, the flow ratio between the first and second portions is used to control the degree of recovery of a desired product in the bottom product of the distillation column. Especially preferred feed streams in such methods include natural gas liquids in vapor and/or liquid form, which can be provided by a high-pressure separator.

Viewed from another perspective, a method of operating a natural gas liquids plant has a step in which an absorber is provided, wherein the absorber is fluidly coupled to a distillation column, and wherein the absorber receives a feed gas vapor, a feed gas liquid, and an overhead product from the distillation column. In such methods, at least two of (a) a portion of the feed gas vapor, (b) a portion of the feed gas liquid, and (c) a portion of the overhead product are fed to the absorber in a manner effective to control absorber overhead temperature such that ethane content in the bottom product of the distillation column increases when the absorber overhead temperature decreases. It is generally preferred that in such methods the absorber is operated at a pressure that is equal or higher than the pressure in the distillation column.

Various objects, features, aspects and advantages of the present invention will become more apparent from the accompanying drawing and the following detailed description of preferred embodiments of the invention.

DETAILED DESCRIPTION

Figure 1:
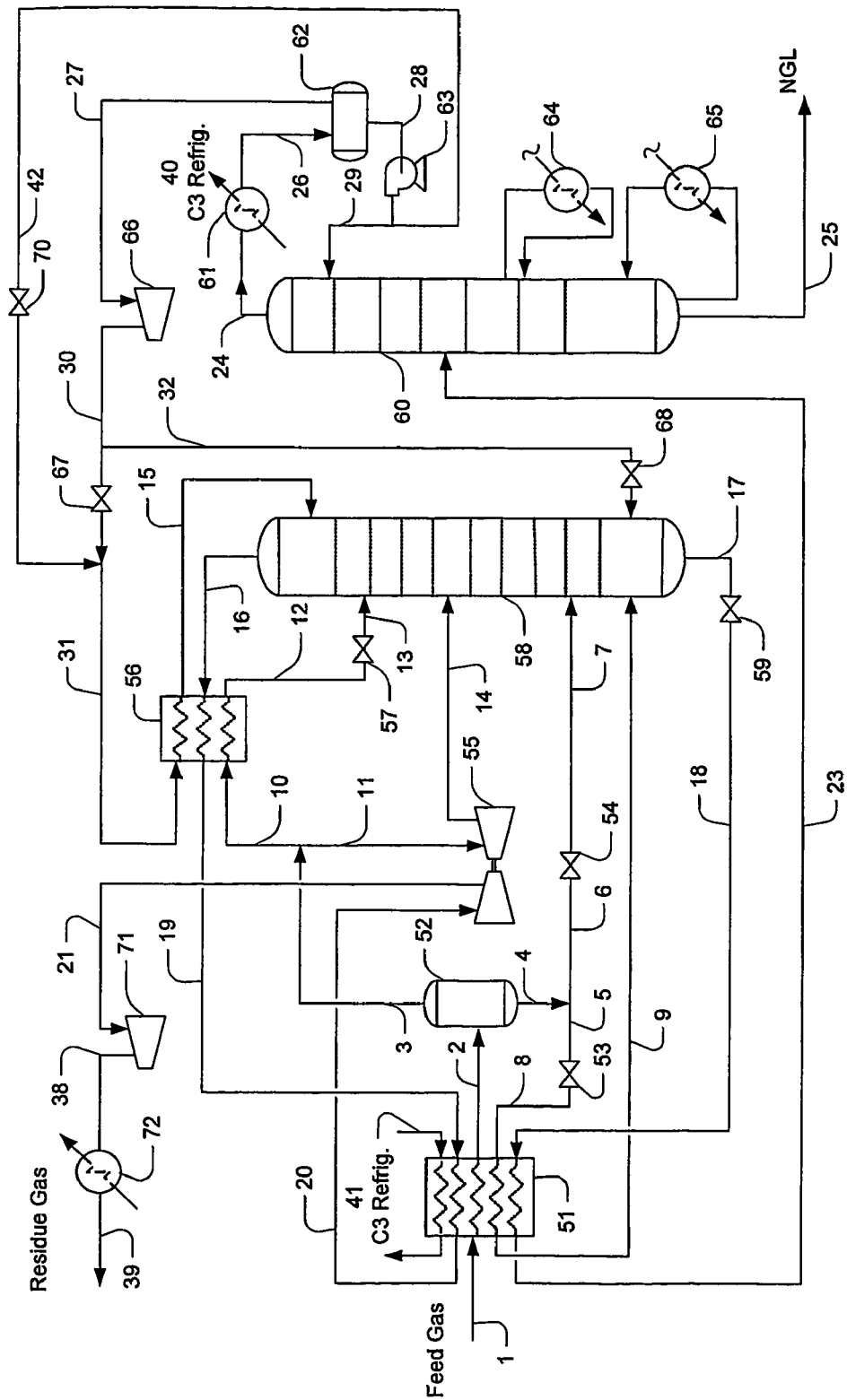
FIG. 1 is a schematic configuration of one NGL plant according to the inventive subject matter in which the absorber operates at higher pressure than the distillation column.

The inventors have discovered that high and flexible NGL recovery (e.g., at least 99% $C_3$, and above at least 90% $C_2$ as desired) may be achieved, when a plant includes an absorber that receives at least two reflux streams. In one preferred aspect, the plant is configured as a two-column plant in which a first column operates as a reflux absorber, and in which a second column operates as either demethanizer or deethanizer. Such configurations will advantageously allow change in component recovery by changing process temperature, split ratios, and/or the feed locations of at least one of the feed streams to the absorber.

In one particularly preferred configuration, the absorber operates at a higher pressure than the second column with the bottom liquid from the absorber being JT'd (i.e., let down in pressure via Joule-Thompson valve) or otherwise expanded and fed to the second column. It should be especially appreciated that the JT effect of the absorber bottom supplies a portion of refrigeration for feed gas chilling. The overhead vapor from the second column is compressed in a recycle compressor and returned to the first distillation column.

In another particularly preferred configuration, the absorber operates at about the same pressure (e.g., pressure difference no more than 25 psi, more typically no more than 15 psi) as the second column with the bottom liquid from the absorber being pumped to the second column. The refrigerant content of the absorber bottom is used for chilling the feed gas prior to feeding the second column. In yet another particularly preferred configuration where the second column operates at a lower pressure than the absorber, a recycle compressor driven by the power generated by the turbo-expander is used, eliminating the need for additional residue gas compression.

Additionally, it is generally preferred that the overhead vapor from the second distillation column is split into two portions, wherein the first portion is chilled in a reflux exchanger with the overhead vapor from the absorber to thereby form a cold reflux to the top section of the absorber. The second portion of the overhead vapor is fed to the bottom of the absorber to form a stripping gas. Therefore, the split ratio of the first vapor portion to the second vapor portion from the second distillation column determines operation of the plant as ethane recovery (varying from 10% to 90%) or ethane rejection. Moreover, the first distillation column is preferably also fed by a second reflux stream generated by chilling a first portion of cold vapor from the high-pressure separator. This second reflux is fed to a located just below the top reflux. The second portion of cold vapor from the high-pressure separator is letdown in pressure via a turbo-expander (or other expansion device) into the mid section of the absorber, wherein the split ratio of the first vapor portion to the second vapor portion from the high pressure separator determines operation of the plant as ethane recovery (e.g., varying from 10% to 90%) or ethane rejection.

In especially preferred aspects, it should be recognized that the lean vapor stream from the second column and the lean vapor stream from the high pressure separator are at least partially (and more preferably completely) condensed by heat exchange with the overhead vapor from the absorber and are subsequently fed to the top section of the absorber as lean reflux streams. These two reflux streams significantly improve the separation efficiency as compared to the single reflux configurations in currently known plants. For example, the majority of the overhead vapor from the second column bypasses the reflux exchanger during ethane recovery and is routed directly to the bottom of the absorber. This stream may advantageously serve as a stripping vapor for the absorber, thereby further enhancing the separation efficiency of the absorber and re-absorption of the ethane component in the stripping vapor. Thus, contemplated plants will achieve even higher ethane or propane recovery in the two-column process.

With respect to the liquid from the high-pressure separator, it is generally preferred that the liquid is split into two portions and separately fed to the absorber. Once more, the split ratio of the feed gas liquids will determine ethane recovery to a desired level or total ethane rejection. In especially preferred aspects, the first portion of the feed gas liquid is directly routed to a tray above the bottom of the absorber; while the second portion is heated with the inlet gas in an inlet gas exchanger and fed to the bottom of the absorber. The use of the cold liquid from the high-pressure separator after being J-T'd is effective for rectification for the recycle vapor from the second column. Thus, the use of split ratio control will allow flexibility for different recovery operations. The term "high-pressure separator" refers to a separator that receives the feed gas at a pressure between about 500 psig to about 2000 psig, and more typically between about 700 psig to about 1300 psig. Furthermore, where the term "about" is used in conjunction with a numeral, contemplated numerals include that numeral and a +/−10% absolute deviation (inclusive) thereof.

In a particularly preferred configuration as depicted in FIG. 1, a plant comprises an absorber 58 that is fluidly coupled to a distillation column 60. To reduce the energy consumption for residue gas compression 71, the absorber 58 operates at a higher pressure than the distillation column 60. A compressor 66 is employed for recompression of the distillation column overhead vapor to recycle desirable components to the absorber for recovery. Typically, the absorber operates between about 400 psig and about 650 psig while the second column serving as a demethanizer (during ethane recovery) or a deethanizer (during ethane rejection) operates between about 400 psig to about 500 psig. While higher pressures would further reduce power consumption by the residue gas compressor, separation of desirable product becomes difficult due to the reduced relative volatilities among components at higher pressures. The optimum column pressure is generally determined by the feed gas compositions, operating conditions and project economics. It should be noted that where the absorber operates at relatively low pressure (most typically at the pressure of the second distillation column), the recycle compressor can be eliminated.

A typical feed gas composition (in mole percent) was used for the following example: 1% $CO_2$, 86% $C_1$, 5% $C_2$, 4% $C_3$, 3% $C_4$ and 2% $C_5+$. The feed gas stream 1, at 110° F. and 1000 psig, is cooled in a heat exchanger 51 using the refrigeration content of the residue gas stream 19, the expanded separator liquid stream 8, the expanded absorber bottom liquid stream 18, and optionally supplemental propane refrigerant stream 41. The feed gas is typically cooled to about −15° F. to −55° F. forming cooled stream 2, which is separated in the separator 52 into a vapor portion 3, and a liquid portion 4 (that is further split into stream 5 and stream 6). The split ratio between streams 5 and 6 is adjusted as necessary for fractionation to a desired product composition.

For example, when a high ethane recovery is required, the flow rate of stream 6 is increased relative to stream 5. Stream 6 is letdown in pressure to about 600 psia via JT valve 54 to form expanded stream 7, which is fed into the rectification section of absorber 58. During ethane recovery, stream 6, containing mainly the $C_3$ and heavier components, acts as a sponge liquid for absorbing and condensing the ethane content in stream 32 rising at the bottom of the absorber. During ethane rejection, the flow rate of stream 5 relative to stream 6 is increased. Stream 5 is letdown in pressure to about 600 psia via JT valve 53 forming stream 8. The refrigeration content of stream 8 is used to cool the feed gas in exchanger 51 to form stream 9 at a temperature of about −10° F. to −40° F. Stream 9 is routed to the bottom of the absorber and provides at least a portion of stripping vapor during ethane rejection operation.

Cryogenic chilling of the feed gas is achieved with vapor stream 3 from the high-pressure separator 52 using both JT and turbo-expander operations. Here, vapor stream 3 is split into two portions, stream 11 and stream 10. The first portion, stream 11 is expanded in a turbo-expander 55 forming an expanded stream 14 (typically at about −75° F. to −115° F.), which is introduced into near the mid section of absorber 58. The second portion stream 10 is cooled in heat exchanger 56 to about −80° F. to −130° F. and reduced in pressure via JT valve 57 to thereby form cold reflux stream 13 (typically at about −115° F. to −140° F.). Stream 13 is fed into the absorber 58 as a second reflux stream. The split ratio between streams 10 and 11 is also adjusted as necessary to achieve the desired fractionation.

For example, when high ethane recovery is required, the flow ratio of stream 10 to stream 3 is increased (e.g., to about 0.2 to 0.4), resulting in an increase in flow rate of stream 10 to exchanger 56. Stream 10 is cooled and partially or entirely condensed in exchanger 56 using the refrigeration content from the absorber overhead vapor stream 16, thereby forming stream 12. This cold stream is further JT'd, and used as a cold and lean reflux for rectification and recovery of the ethane and heavier components in the absorber. During ethane rejection, the flow ratio of stream 10 to stream 3 is lowered or even eliminated (e.g., to about 0.0 to 0.2), resulting in a lower flow rate of stream 10. Under such conditions, re-condensation of the ethane component is reduced or even entirely avoided, which reduces internal reflux during the ethane rejection operation. The absorber rectification section operates then at a higher temperature as needed for the ethane rejection operation. For example, during ethane rejection, the absorber typically operates at about −95° F. as compared to −135° F. during ethane recovery operation.

To further enhance the liquid recovery efficiency, absorber 58 also receives a first reflux stream 15 that is formed from cooling a portion of the compressed vapor stream 30 from the distillation column 60. Optionally for ethane rejection, a portion of the distillate from the second distillation column, stream 42, can be used to provide additionally reflux after being J-T'd in JT valve 70 and being chilled in exchanger 56. The use of the distillate liquid from the column is particularly advantageous when processing feed gas that is rich in ethane content, preferably over 15% mole percent of ethane.

The compressed stream 30 is split into stream 31 and stream 32 wherein the split ratio determines the levels of ethane recovery. For example, during ethane rejection, the flow ratio of stream 31 relative to stream 30 is increased (e.g., to about 0.8 to 1.0). Consequently, the majority or all of the recycle stream is routed as stream 31 to be chilled and condensed in exchanger 56, forming reflux stream 15 (typically between about −80° F. to −100° F.). It should be noted that stream 15 is rich in ethane and therefore particularly effective as a lean reflux for propane recovery. During ethane recovery, the flow ratio of stream 31 relative to stream 30 is reduced (e.g., to about 0.0 to 0.2). Consequently, the flow of reflux stream 31 is reduced and the flow of stream 32 is increased. The temperature of stream 32 is typically between 20° F. to −20° F. (i.e., in superheated state after compression).

The absorber, typically operating between 400 psig to 650 psig, produces an overhead stream 16 and a bottom stream 17. It should be recognized that the temperatures of streams 16 and 17 will vary depending on the levels of ethane recovery. For example, during high ethane recovery, the overhead temperature is generally maintained at about −110° F. to about −145° F. During ethane rejection, the overhead temperature is increased to about −80° F. to about −100° F. Refrigeration content in the absorber overhead stream 15 is recovered in heat exchanger 56 by providing cooling to the first and second reflux streams 31 and 10 respectively. The residual refrigeration is then used in heat exchanger 51 for chilling the feed gas. The absorber bottom stream 17 is letdown in pressure and cooled by JT valve 59 (forming stream 18) to supply additional refrigeration for chilling the feed gas. Stream 18, typically at about 20° F. to about −40° F. is heated in exchanger 51 to about 60° to about 100° F. forming stream 23 prior to entering the upper section of the second distillation column 60.

Distillation column 60 (typically operating at about 400 to about 500 psig) serves as a demethanizer during ethane recovery operation and fractionates stream 23 into an ethane and heavier bottom product 25 and a methane rich overhead stream 24. On the other hand, distillation column 60 functions as a deethanizer during ethane rejection operation, producing a propane rich bottom product and an ethane rich overhead vapor. The overhead vapor is condensed using propane refrigeration stream 40 in reflux exchanger 61, forming stream 26 at about −10° F. to about −40° F. Stream 26 is separated in reflux drum 62 into a liquid stream 28 and a vapor stream 27. The liquid stream 28 is pumped by reflux pump 63 forming stream 29 and returned to the top of the distillation column as reflux. A portion of the distillation may be used as reflux in the absorber as previously described. It should also be appreciated that the distillation column 60 operates at a temperature that allows the use of low-cost carbon steel (e.g., about −40° F. or higher). In contrast, conventional configurations typically require operation of the distillation column at cryogenic temperatures (i.e., below −40° F.), particularly during the ethane recovery, which necessitates the use of low-temperature grade steel.

The vapor stream 27 is compressed by compressor 66 to form stream 30, which is split into stream 31 (and let down in pressure via JT valve 67) and 32 (and let down in pressure via JT valve 68). Thus, one portion of stream 27 is used for reflux while another portion is employed for ethane re-absorption at the bottom of the absorber 58. The heating requirement in the distillation column 60 is supplied with side-reboiler 64 (optional) using either heat content from the feed gas or from the bottom product, and may further be supplemented with the bottom reboiler 65 using an external heat source. Depending on the particular feed gas compositions and operating conditions, the temperature of the NGL bottom product 25 ranges from about 100° F. to about 250° F.

The residue gases stream 20 exits the feed exchanger 51 at about 370 psig to about 600 psig and is compressed by the expander compressor 55, to about 420 psig to about 650 psig, thereby forming compressed residue gas stream 21. If necessary, additional recompression with compressor 71 can be used to boost the residue gas pressure to the sales gas pipeline. Optionally, the compressor discharge vapor stream 38 is cooled in exchanger 72 forming stream 39 prior to the sales gas pipeline;

The following table shows the key process conditions, the split ratios and the refrigeration power consumption in achieving the various levels (0% to 90%) of ethane recovery and 97% or higher propane recovery. Higher ethane recovery operation requires lowering the separator and absorber overhead temperature, hence an increase in refrigeration requirement that is supplied by the refrigeration compressor and/or higher expansion ratio across the turboexpander by lowering the absorber pressure. In all operations, the second column operates at about −40° F. or higher temperatures, requiring only carbon steel material of construction.

|  | Operating Case | | | | |
| --- | --- | --- | --- | --- | --- |
|  | 1 | 2 | 3 | 4 | 5 |
| C₂ Recovery | 0% | 40% | 60% | 80% | 90% |
| C₃ Recovery | 98% | 98% | 97% | 98% | 99% |
| Key Process Conditions: | | | | | |
| Separator 52, ° F. | −35 | −40 | −52 | −52 | −54 |
| Exchanger 56 Outlet (stream 12), ° F. | −80 | −100 | −103 | −116 | −129 |
| Separator 52 Vapor Ratio (stream 10 to 3) | 0.20 | 0.32 | 0.37 | 0.37 | 0.37 |
| Separator 52 Liquid Ratio (stream 5 to 4) | 1.00 | 1.00 | 0.80 | 0.60 | 0.25 |
| Recycle Vapor Ratio (stream 31 to 30) | 0.83 | 0.35 | 0.00 | 0.00 | 0.00 |
| Absorber Overhead (stream 16), ° F. | −83 | −104 | −107 | −121 | −134 |
| Absorber Overhead (stream 16), psia | 588 | 588 | 588 | 498 | 418 |
| Recycle Compressor 66, HP | 665 | 693 | 705 | 612 | not req'd |
| Refrigeration Compressor, HP | 7,817 | 7,026 | 10,656 | 11,751 | 14,390 |

Figure 2:
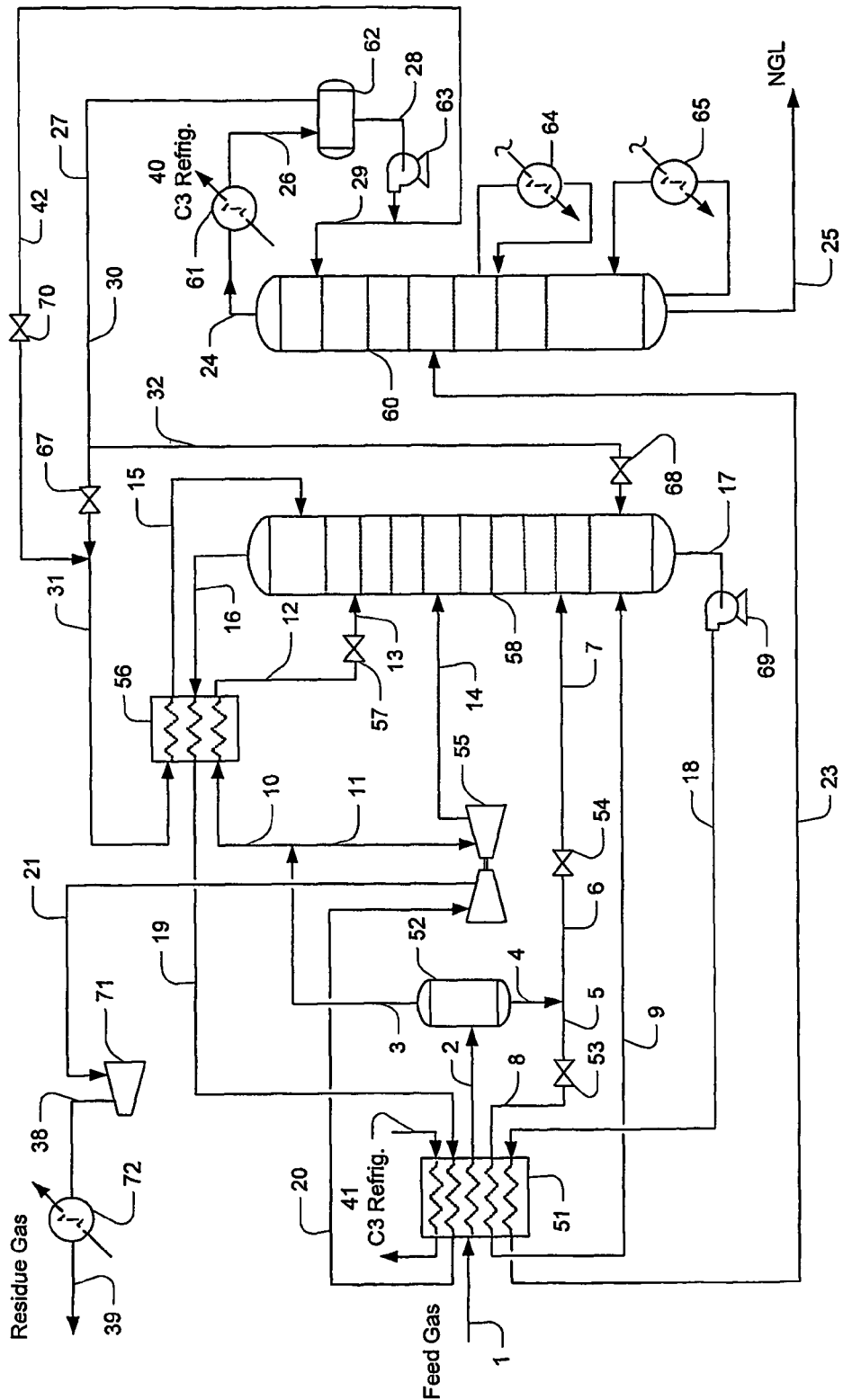
FIG. 2 is a schematic configuration of another NGL plant according to the inventive subject matter in which the absorber operates at the same pressure than the distillation column.

In second particularly preferred configuration as depicted in FIG. 2, a plant comprises an absorber 58 that is fluidly coupled to a distillation column 60, with the absorber operating at about the same pressure as the distillation column. In this configuration, the absorber operates at about 400 psig to about 500 psig, with the distillation column operating at about 410 psig to about 510 psig. With the second column operating at a slightly higher pressure, recycle compressor 66 of FIG. 1 is not required. This case is shown as Operating Case 5 in Table 1 when high ethane recovery of 90% is desired. It should be noted that the process conditions, in particular the split ratios for different levels of ethane recovery, are similar to the previous design. However, recycle compressor 66 is not required, and the overhead vapor 30 can be routed to the exchanger 56 to be chilled forming reflux to the absorber and/or routed to the bottom of the absorber as a stripping vapor. In addition, an absorber bottom pump 69 is required to boost the absorber bottom pressure to feed the second distillation column. With respect to the remaining components and numbering, the same numerals and considerations as in FIG. 1 apply.

Figure 3:
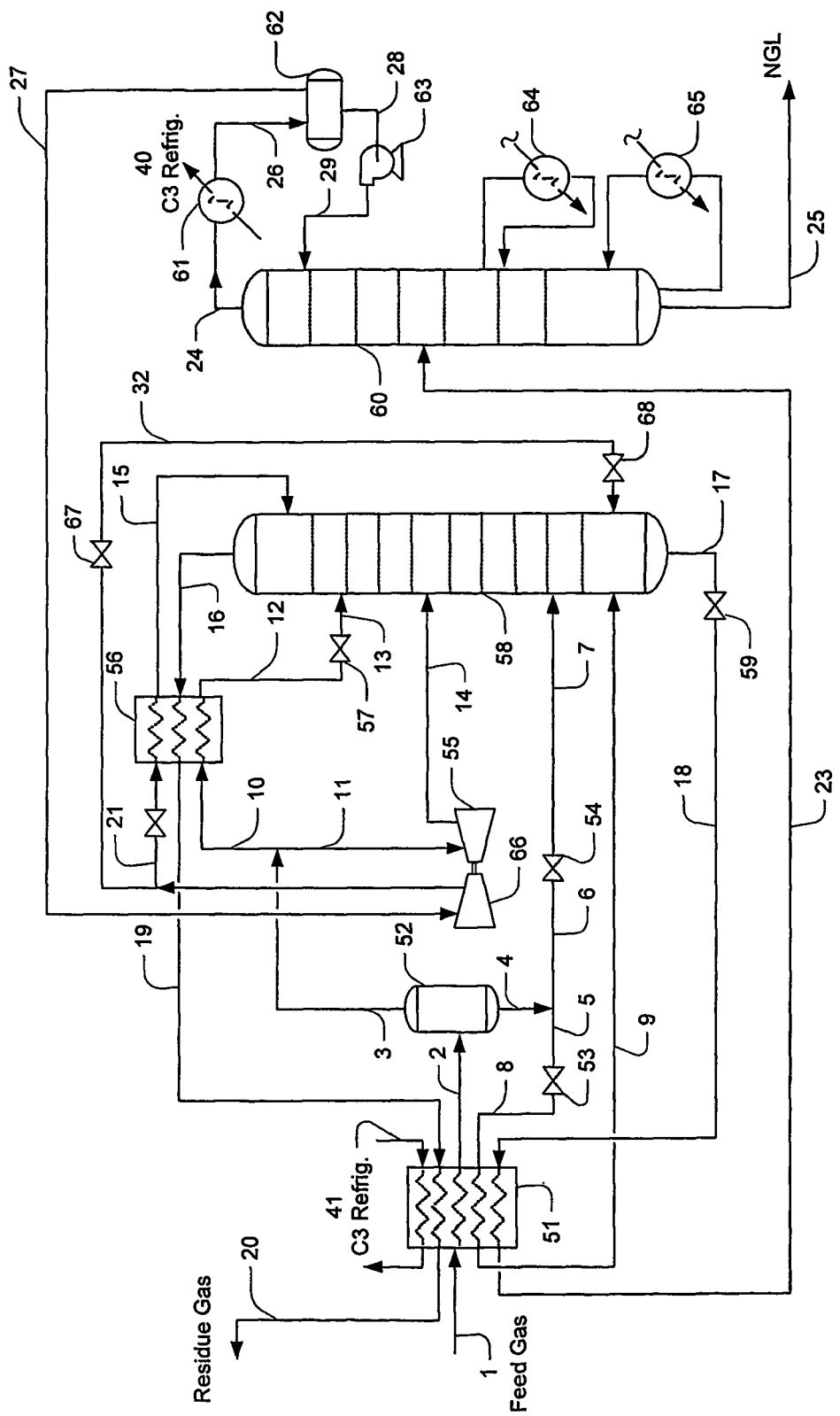
FIG. 3 is a schematic configuration of a further NGL plant according to the inventive subject matter in which the absorber operates at higher pressure than the distillation column.

In a third particularly preferred configuration as depicted in FIG. 3, a plant comprises an absorber 58 that is fluidly coupled to a distillation column 60, with the absorber operating at a higher pressure than the distillation column. In this configuration, the absorber operates at above the sales gas pressure of about 510 psig to about 610 psig, without the need of a separate residue gas compressor 71 of FIG. 1 and FIG. 2. The second distillation column operates at a lower pressure, typically between about 300 psig to about 400 psig, with the overhead vapor compressed by the recycle gas compressor 66 driven by the turbo-expander 55, returning to the absorber after being chilled in exchanger 56. Once more, the remaining process parameters and components are similar to configuration described in FIG. 1, and with respect to the remaining components and numbering, the same numerals and considerations as in FIG. 1 apply.

With respect to suitable feed gas streams, it is contemplated that various feed gas streams are appropriate, and especially suitable feed gas streams may include various hydrocarbons of different molecular weight. With respect to the molecular weight of contemplated hydrocarbons, it is generally preferred that the feed gas stream predominantly includes $C_1$-$C_6$ hydrocarbons. However, suitable feed gas streams may additionally comprise acid gases (e.g., carbon dioxide, hydrogen sulfide) and other gaseous components (e.g., hydrogen). Consequently, particularly preferred feed gas streams are natural gas and natural gas liquids.

In still further preferred aspects of the inventive subject matter, the feed gas streams are cooled to condense at least a portion of the heavier components in the feed gas stream, and in especially preferred configurations, the feed gas stream is cooled, separated into a vapor portion and a liquid portion, wherein the vapor portion is further cooled and separated into a second vapor portion and second liquid portion. While not limiting to the inventive concepts presented herein, it is particularly preferred that these cooling steps may be achieved using the refrigerant content of the absorber overhead product and/or the absorber bottom product.

Additionally, or alternatively, it is further preferred that the separated liquids from the feed gas stream are fed into the absorber at the lower section for rectification. With respect to the vapor portions, it should be recognized that the second vapor portion is split into a bypass stream and a turbo-expander stream, wherein the turbo-expander stream is fed into a turbo-expander and subsequently into the absorber, and wherein the bypass stream is further cooled, preferably using the refrigerant content of the absorber overhead product, and then let down in pressure via a device other than a turbo-expander before entering the upper section of absorber as a first second reflux stream. Especially suitable devices include Joule-Thomson valves, however, all other known devices and methods to reduce pressure are also considered suitable for use herein. For example, suitable alternative devices might include power recovery turbines and expansion nozzles devices.

Moreover, it is preferred that the overhead vapor from the second distillation column is split into two portions with one being fed into the absorber as a first reflux to the absorber or to the lower section for rectification in recovery of the ethane components. With respect to the vapor portions, it should be recognized that the reflux vapor portion is fed into an overhead exchanger that is cooled and condensed by the absorber overhead vapor prior being used as reflux into the absorber, and wherein the bottom portion is routed directly to the bottom of absorber for ethane recovery.

The absorber overhead and bottom products are preferably employed as refrigerant in a heat exchanger, wherein the heat exchanger provides cooling for the first and second reflux streams. Furthermore, it is preferred that the absorber overhead product may act as a refrigerant in at least one, and preferably at least two additional heat exchangers, wherein the absorber overhead product cools the separated vapor portion of the feed gas and the feed gas stream before recompression to residue gas pressure. Similarly, the absorber bottom product is employed as a refrigerant to cool the feed gas stream before entering the distillation column as column feed. Suitable absorbers may vary depending on the particular configuration. However, it is generally preferred that the absorber is a tray or packed bed type absorber.

The absorber bottom product is separated in a distillation column to form the desired bottom product (e.g., $C_2$/$C_3$+ or $C_3$/and $C_4$+). Consequently, depending on the desired bottom product, appropriate distillation columns include a demethanizer and a deethanizer. Where the desired bottom product is $C_3$ and $C_4$+, it is contemplated that the distillation column overhead product is cooled in a cooler (e.g., using external refrigerant) and separated into a distillation column reflux portion and a vapor portion. Thus, it should be especially appreciated that the vapor overhead product from the distillation column is further split and may be employed as a reflux stream for the absorber, wherein the reflux stream is a lean reflux stream that is fed to the top tray of the absorber. Similarly, where the desired bottom product is $C_2$/$C_3$+, it is contemplated that the distillation column overhead product bypasses the cooler and the vapor portion is employed as a bottom feed to the absorber. Again, it should be especially appreciated that in such ethane recovery configurations, the vapor overhead product from the distillation column is recycled back to the absorber for re-absorption of the $C_2$ plus components resulting in high ethane recovery.

For intermediate levels of desired $C_2$/$C_3$+ bottom product, it is contemplated that the distillation column overhead product partially bypasses the cooler and the vapor portion is employed as a bottom feed to the absorber. Again, it should be especially appreciated that in such ethane recovery configurations, only a portion of the vapor overhead product from the distillation column is recycled back to the absorber for re-absorption of the $C_2$ plus components resulting in high ethane recovery.

Thus, it should be especially recognized that in contemplated configurations, the cooling requirements for the absorber are at least partially provided by the reflux streams (via cooling by absorber bottom and overhead products), and that the $C_2$/$C_3$ recovery significantly improves by employing a first and a second reflux stream. With respect to the $C_2$ recovery, it is contemplated that such configurations provide at least 85%, more typically at least 88%, and most typically at least 90% recovery, while it is contemplated that $C_3$ recovery will be at least 95%, more typically at least 98%, and most typically at least 99%.

Thus, specific embodiments and applications of flexible NGL processes and methods have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. A plant comprising:
   a feed gas separator;
   an absorber having first and second vapor ports fluidly coupled to the feed gas separator to separately receive a first and a second portion of a feed gas vapor, and having first and second liquid ports fluidly coupled to the feed gas separator to separately receive a first and a second portion of a feed gas liquid, and further having first and second overhead ports fluidly coupled to a downstream distillation column to separately receive a first and a second portion of a downstream distillation column overhead;
   wherein the absorber is further fluidly coupled to the downstream distillation column such that an absorber bottom product is fed to the downstream distillation column;
   wherein the first portion of the feed gas vapor and the first portion of the distillation column overhead provide reflux to the absorber, and wherein the second portion of the distillation column overhead provides a vapor stream enriched in ethane for ethane re-absorption and stripping at a bottom portion of the absorber; and
   a control unit configured to adjust a ratio of the first and second portion of the feed gas vapor, the first and second portion of the feed gas liquid, and the first and second portion of the distillation column overhead such that ethane recovery is increased in a bottom product of the distillation column when the ratio of the first to the second portion of the feed gas vapor is increased, when the ratio of the first to the second portion of the feed gas liquid is increased, and when the ratio of the first to the second portion of the distillation column overhead is decreased.

2. The plant of claim 1 wherein the distillation column is configured to operate as at least one of a demethanizer and a deethanizer.

3. The plant of claim 1 wherein the ratio of the first and second portions of the feed gas vapor, of the first and second portions of the feed gas liquid, and of the first and second portions of the distillation column overhead determines absorber overhead temperature.

4. The plant of claim 1 wherein the absorber is configured to operate at an absorber pressure, wherein the distillation column is configured to operate at a distillation column pressure, and wherein the absorber pressure is greater than the distillation column pressure.

5. The plant of claim 4 wherein an absorber bottom product is expanded to provide at least a portion of feed gas chilling.

6. The plant of claim 1 further comprising a feed gas exchanger that is configured to cool a feed gas using refrigeration content of the second portion of the feed gas liquid.

7. A method of operating a plant comprising:
   providing an absorber and a downstream distillation column, wherein the absorber provides a bottom product to the distillation column;
   splitting a liquid portion of an absorber feed stream into a first and second portion, and introducing the first and second portions of the liquid portion at different locations to the absorber;
   feeding a first portion of a distillation column overhead to the absorber as a reflux and a second portion of the distillation column overhead as an ethane-enriched vapor stream to the absorber for ethane re-absorption and stripping at a bottom portion of the absorber;
   splitting a vapor portion of the absorber feed stream into a first and second portion, and introducing the first and second portions of the vapor portion at different locations to the absorber, the first portion of the vapor portion introduced as reflux; and
   adjusting a ratio of the first and second portion of the vapor portion, the first and second portion of the liquid portion, and the first and second portion of the distillation column overhead such that ethane recovery is increased in a bottom product of the distillation column by increasing the ratio of the first to the second portion of the vapor portion, increasing the ratio of the first to the second portion of the liquid portion, and decreasing the ratio of the first to the second portion of the distillation column overhead.

8. The method of claim 7 wherein the absorber feed stream comprises a natural gas liquids vapor and natural gas liquids liquid.

9. The method of claim 7 wherein the vapor portion of the absorber feed stream and the liquid portion of the absorber feed stream are provided by a high-pressure separator.

10. The method of claim 7 wherein the absorber is operated at a pressure that is higher than a pressure in the distillation column.

* * * * *